US008775423B2

(12) United States Patent
Pereyra-Rozas

(10) Patent No.: US 8,775,423 B2
(45) Date of Patent: Jul. 8, 2014

(54) DATA MINING ACROSS MULTIPLE SOCIAL PLATFORMS

(75) Inventor: Alejandro Pereyra-Rozas, Olivos (AR)

(73) Assignee: Verizon Argentina S.R.L., Buenos Aires (AR)

( * ) Notice: Subject to any disclaimer, the term of this patent is extended or adjusted under 35 U.S.C. 154(b) by 298 days.

(21) Appl. No.: 13/233,571

(22) Filed: Sep. 15, 2011

(65) Prior Publication Data

US 2013/0073547 A1 Mar. 21, 2013

(51) Int. Cl.
*G06F 7/00* (2006.01)

(52) U.S. Cl.
USPC ........... 707/736; 707/600; 707/737; 707/776; 715/762

(58) Field of Classification Search
USPC .................................................. 707/736, 776
See application file for complete search history.

(56) References Cited

U.S. PATENT DOCUMENTS

2007/0016575 A1* 1/2007 Hurst-Hiller et al. ............. 707/5
2007/0255712 A1* 11/2007 Mahoney et al. ................. 707/9
2012/0016885 A1* 1/2012 Jin et al. ........................ 707/748
2012/0151359 A1* 6/2012 Mysen et al. ................. 715/736
2013/0046761 A1* 2/2013 Soderberg et al. ............ 707/736

* cited by examiner

*Primary Examiner* — Tony Mahmoudi
*Assistant Examiner* — Tuan-Khanh Phan

(57) ABSTRACT

One or more devices store in a memory, customer tags originating on an external social platform and employee tags originating on an internal social platform. The one or more devices provide to a user device, keyword suggestions for new content to be published on the internal social platform. The keyword suggestions include selections from both the customer tags and the employee tags. The one or more devices receive employee metadata, for content published on the internal social platform, that includes tags selected from the keyword suggestions, and associates the tags in the employee metadata as customer-originated tags or employee-originated tags based on the stored customer tags and employee tags. The one or more devices perform data correlation to determine relationships between use of the customer-originated tags and use of the employee-originated tags in the employee metadata.

18 Claims, 8 Drawing Sheets

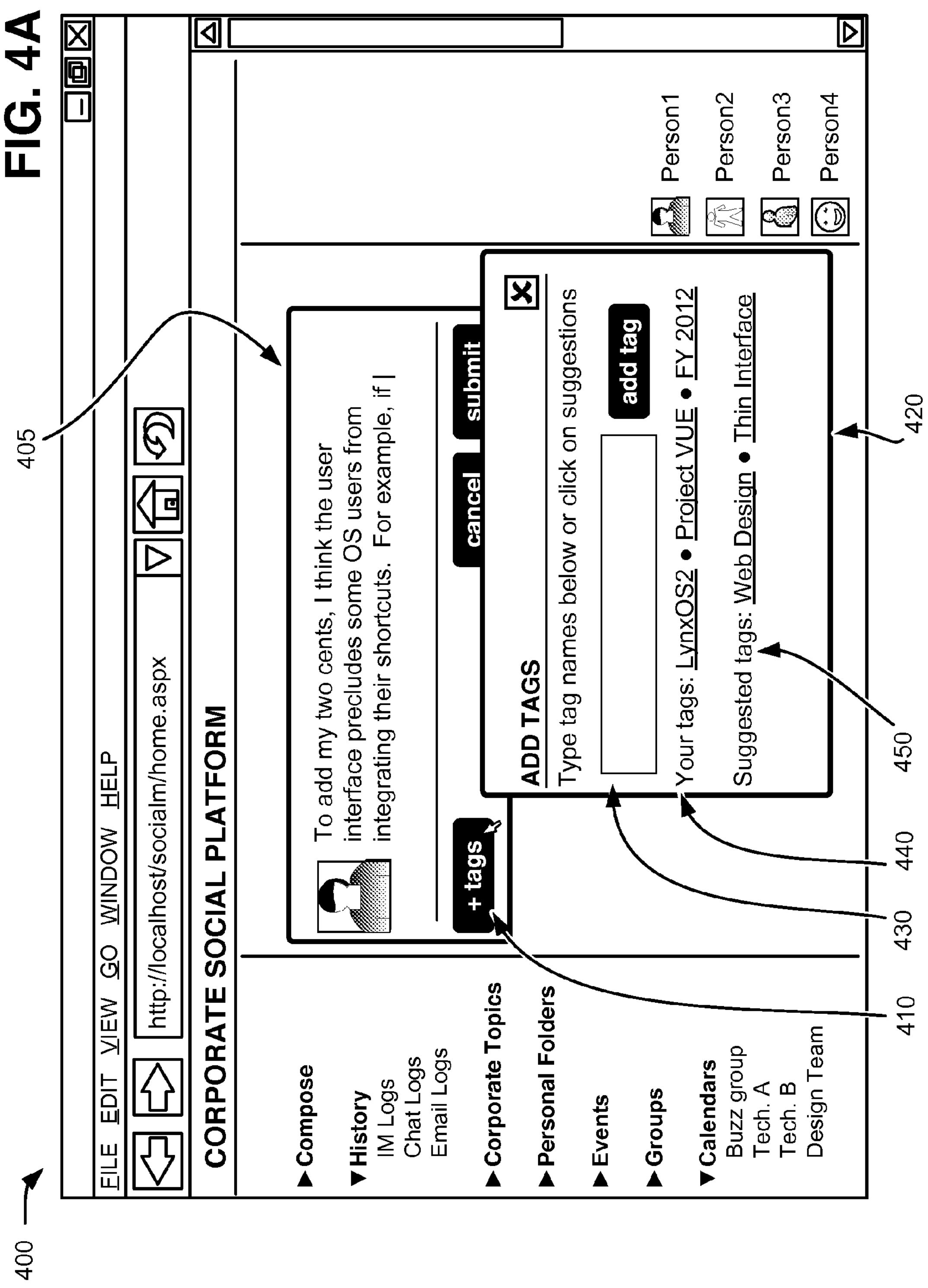

FIG. 4A
400
405
410
420
430
440
450
FILE EDIT VIEW GO WINDOW HELP
http://localhost/socialm/home.aspx
CORPORATE SOCIAL PLATFORM
Compose
History
IM Logs
Chat Logs
Email Logs
Corporate Topics
Personal Folders
Events
Groups
Calendars
Buzz group
Tech. A
Tech. B
Design Team
To add my two cents, I think the user interface precludes some OS users from integrating their shortcuts. For example, if I
+ tags
cancel
submit
ADD TAGS
Type tag names below or click on suggestions
add tag
Your tags: LynxOS2 • Project VUE • FY 2012
Suggested tags: Web Design • Thin Interface
Person1
Person2
Person3
Person4

| PostID | IntTag1 | IntTag2 | IntTag3 | IntTag4 | ExtTag1 | ExtTag2 | ExtTag3 |
|---|---|---|---|---|---|---|---|
| P1 | 1 | | 1 | 1 | 1 | | |
| P2 | | 1 | | | | | |
| P3 | | 1 | | | | 1 | |
| P4 | 1 | | | 1 | | | |
| P5 | 1 | | | | 1 | 1 | |
| P6 | | 1 | | | | | |
| P7 | | | 1 | | | | |
| P8 | | | 1 | 1 | 1 | | |

600

DATA MINING ACROSS MULTIPLE SOCIAL PLATFORMS

BACKGROUND

Data mining generally refers to automatic extraction of useful information from large databases or data sets. The use of social media presents numerous opportunities for data mining. Users not only post their data on social platforms but also leave metadata that describes the meaning of the data.

BRIEF DESCRIPTION OF THE DRAWINGS

FIGS. 4A and 4B provide diagrams of sample user interfaces according to an implementation described herein;

DETAILED DESCRIPTION OF PREFERRED EMBODIMENTS

The following detailed description refers to the accompanying drawings. The same reference numbers in different drawings may identify the same or similar elements.

Systems and/or methods described herein may combine metadata from public social platforms (e.g., Facebook®; Twitter®; MySpace®; various topic-specific platforms, such as blogs or forums; etc.) with private social platforms (e.g., internal corporate platforms) to identify relationships between public activity and private (e.g., employee) activity. Public customer metadata captured from public social platforms may be fed into corporate social platforms used by employees. Resulting metadata in the corporate social platform may be data-mined to measure the focus of employees on the customers.

In one implementation, one or more devices may store in a memory, customer tags originating on an external social platform and employee tags originating on an internal social platform. The one or more devices may provide, to a user device, keyword suggestions for new content to be published on the internal social platform. The keyword suggestions may include selections from both the customer tags and the employee tags. The one or more devices may receive employee metadata, for content published on the internal social platform, that includes tags selected from the keyword suggestions, and may associate the tags in the employee metadata as customer-originated tags or employee-originated tags based on the stored customer tags and employee tags. The one or more devices may perform data correlation to determine relationships between use of the customer-originated tags and use of the employee-originated tags in the employee metadata.

As used herein, the terms "user," "customer," and "employee" are intended to be broadly interpreted to include a user device and/or a user application, or a user of a user device and/or a user application. A user application may include any operating system software and/or application software that make use of features and may be executed by a user device.

Also as used herein, the terms "tag" or "keyword" may include metadata, separate from published content, that supplies additional information about the published content. Tags may be in the form of words and/or phrases entered or selected by a user during creation or editing of content to be published on a social platform. In some cases, tags may be associated with particular published content, which may also be referred to as a "post."

Figure 1:
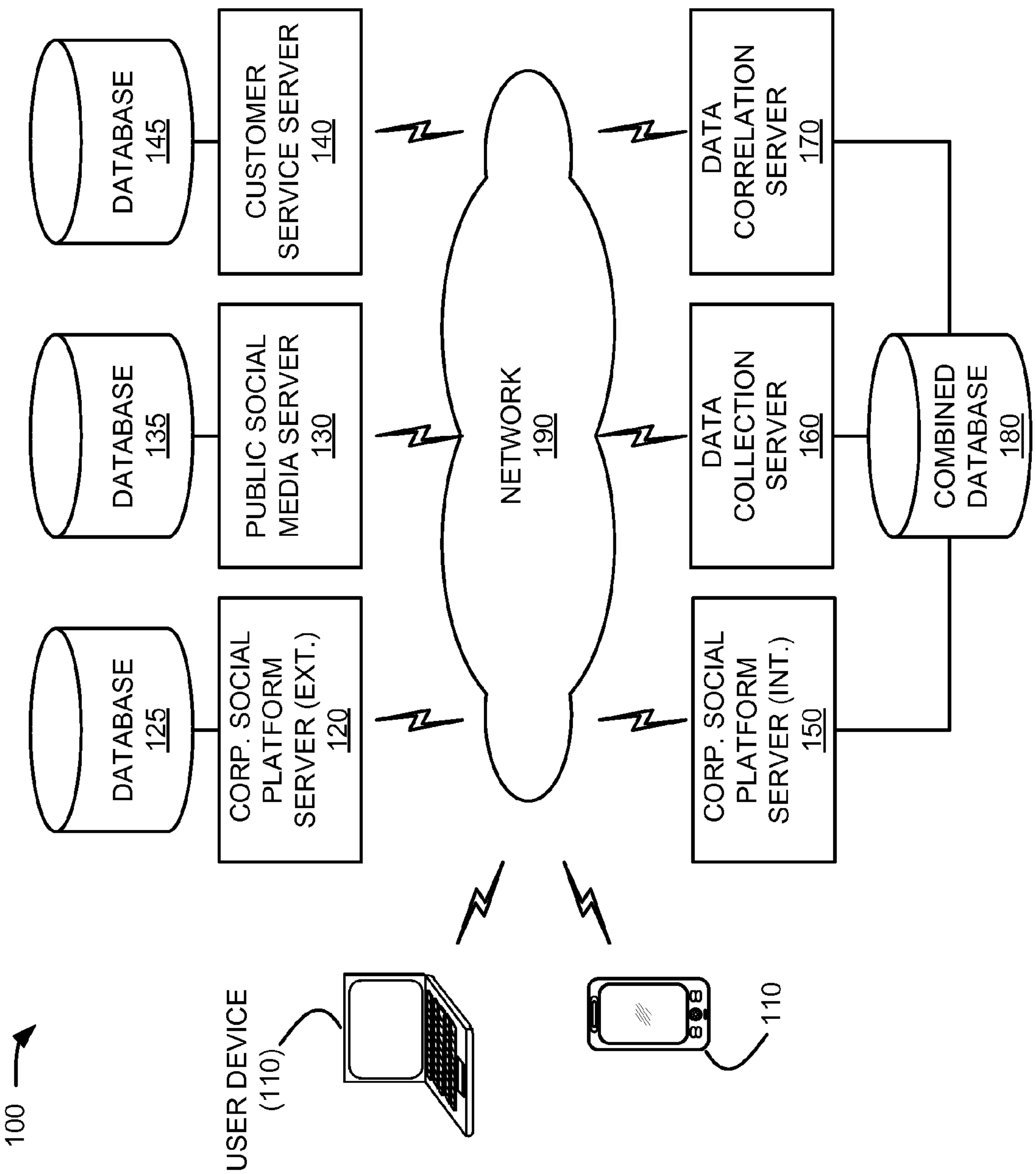
FIG. 1 is an exemplary network in which systems and/or methods described herein may be implemented.

FIG. 1 is an example network 100 in which systems and/or methods described herein may be implemented. As illustrated, network 100 may include user devices 110; a corporate social platform server 120 for external users with a database 125; a public social media server 130 with a database 135; a customer service server 140 with a database 145; a corporate social platform server 150 for internal users; a data collection sever 160; a data correlation server 170; a combined database 180; and a network 190.

Components of network 100 may interconnect via wired and/or wireless connections. The particular arrangement of components in network 100 has been illustrated in FIG. 1 for simplicity. In practice, there may be more, fewer, different, or differently-arranged components. Alternatively, or additionally, one or more components of network 100 may perform one or more other tasks described as being performed by one or more other components of network 100.

Each user device 110 may include one or more computing devices, or other types of computation or communication devices, that gather, process, search, and/or provide information in a manner described herein. In an example implementation, user device 110 may include a personal computer, a radiotelephone, a personal communications system (PCS) terminal (e.g., that may combine a cellular radiotelephone with data processing and data communications capabilities), a wireless telephone, a cellular telephone, a smart phone, a PDA (e.g., that can include a radiotelephone, a pager, Internet/intranet access, etc.), a laptop or tablet computer, a landline telephone, or other types of computation or communication devices. In an example implementation, user device 110 may include a device that is capable of accessing services (e.g., content-related services) provided by the other components of network 100, such as external corporate social platform server 120, public social media server 130, customer service server 140, and/or internal corporate social platform server 150.

Corporate social platform server 120 may include social media applications targeting particular users groups (e.g., subscribers to particular services or members of particular groups). For example, corporate social platform server 120 may include applications for moderated chat sessions and/or web logs ("blogs") that permit publishing of content from external users (e.g., users who do not have access to corporate social platform server 150 for internal users). Corporate social platform server 120 may be associated with database 125 or another storage device.

Public social media server 130 may include social media applications for the general public. For example, public social media server 130 may include applications enabling registered users to publish (or "post") content for viewing by particular contacts or by any user. Public social media server 130 may be associated with database 135 or another storage device.

Customer service server 140 may include social media applications for users of particular products. For example, customer service server 140 may include applications enabling users to publish questions/comments regarding particular products supported by owners of customer service server 140. Answers to questions may be published by, for example, employees of the owner of customer service server 140. Customer service server 140 may be associated with database 145 or another storage device.

In an example implementation, each of corporate social platform server 120, public social media server 130, and customer service server 140 may collect and store user repositories, metadata associated with user posts, and/or any other information associated with user functions. In one implementation, corporate social platform server 120, public social media server 130, and/or customer service server 140 may feed stored customer data and/or metadata to data collection server 160 using, for example, secure network connections over network 190.

Corporate social platform server 150 for internal users may include a closed social media applications for a particular group. For example, applications and content on corporate social platform server 150 may be restricted to users with a particular type of network access, such as employees of a company accessing corporate social platform server 150 through a private internal network. Similar to users of corporate social platform server 120, public social media server 130, or customer service server 140, users of corporate social platform server 150 may publish content (e.g., within the internal network). Corporate social platform server 150 may be associated with database 180 or another storage device. Corporate social platform server 150 may store metadata associated with published content in database 180 and may generate tag suggestions for subsequent content based on the stored metadata.

Data collection sever 160 may receive and/or extract metadata from corporate social platform server 120/database 125, public social media server 130/database 135, and/or customer service server 140/database 145. For example, data collection server 160 may receive tags used in published content. In one implementation, data collection server 160 may add additional information to the received metadata to identify, for example, a source of origin for a particular tag. A source of origin may include for example, a particular one of corporate social platform server 120, public social media server 130, or customer service server 140 or a general indication (e.g., "customer") of a source from outside of corporate social platform server 150.

Data correlation server 170 may retrieve data from combined database 180 to discover relationships between customer metadata and employee metadata. For example, data correlation server 170 may employ associated rule learning or other data correlation techniques to identify use of customer tags in published content on corporate social platform server 150.

Combined database 180 may store metadata from corporate social platform server 150 and data collection server 160. Combined database 180 may be implemented as, for example, a relational or non-relational database capable of storing and accessing data. Combined database 180 may be implemented on a single computing device or distributed across many computing devices and/or storage devices. In some alternate implementations, combined database 180 may be implemented as a simple "flat" file or other similar structure.

Network 190 may include a local area network (LAN), a wide area network (WAN), a metropolitan area network (MAN), an intranet, the Internet, or a combination of networks. In one implementation, network 190 may serve as communication tool between user devices 110 and one or more of corporate social platform server 120, public social media server 130, customer service server 140, and corporate social platform server 150.

Published content from any of servers 120, 130, 140, and 150 may include metadata, such as tags or keywords, that supply additional information about the published content. Tags may be in the form of words and/or phrases and will most likely vary from system to system. For instance, there may be different spelling conventions or abbreviations used for the same concept. These variances can be a major hindrance to compare the occurrence of tags created by employees (e.g., using corporate social platform server 150) and customers (e.g., using corporate social platform server 120, public social media server 130, and/or customer service server 140).

Generally, in social platforms, tags can be suggested by likeness, that is, by displaying tags that contain the string of characters the user is typing. Other methods include tag clouds or tag lists, trending topics, etc. In implementations described herein, metadata (e.g., tags) from customers may be fed into combined database 180, so that when an employee (e.g., using corporate social platform server 150) is writing a tag during content creation or edition, corporate social platform server 150 can suggest tags generated by employees and tags generated by customers. The process provides a feedback loop from the customers to the employees.

Figure 2:
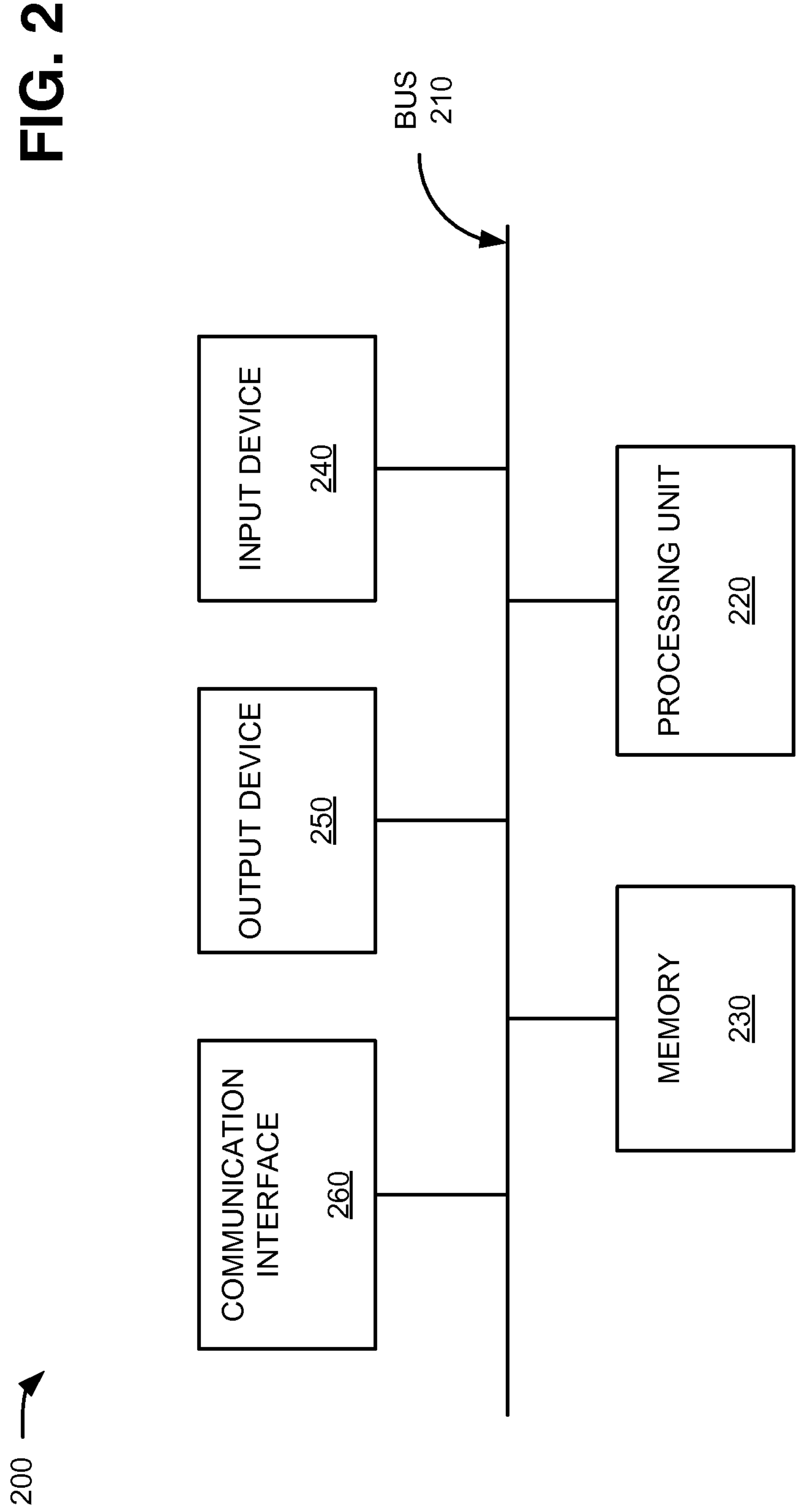
FIG. 2 is a diagram of exemplary components of one of the devices depicted in FIG. 2 and/or FIG. 1.

FIG. 2 is an exemplary diagram of a device 200 that may correspond to one or more of user device 110, corporate social platform server 120, public social media server 130, customer service server 140, corporate social platform server 150, data collection server 160, or data correlation server 170. Each of user device 110, corporate social platform server 120, public social media server 130, customer service server 140, corporate social platform server 150, data collection server 160, and data correlation server 170 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for execution by processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, or the like. Output device 250 may include a device that outputs information to the operator, such as a display, a speaker, etc.

Communication interface 260 may include a transceiver (e.g., a transmitter and/or receiver) that enables device 200 to communicate with other devices and/or systems. For example, communication interface 260 may include mechanisms for communicating with other devices, such as other devices of network 100 or another device 200.

As described herein, device 200 may perform certain operations in response to processing unit 220 executing software instructions contained in a computer-readable medium, such as memory 230. A computer-readable medium may include a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently-arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
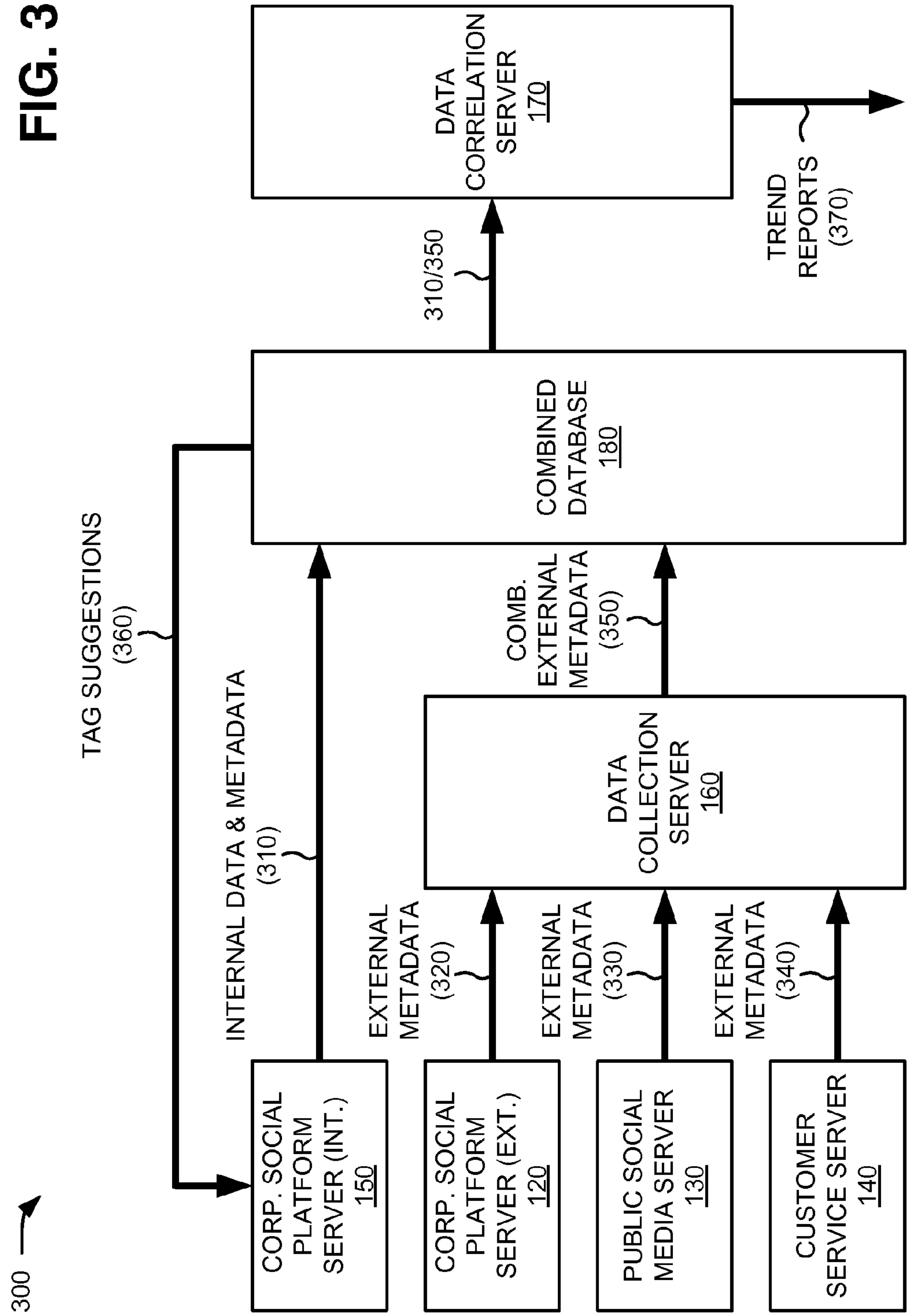
FIG. 3 is a diagram of exemplary communications within a portion of the network of FIG. 1.

FIG. 3 is a diagram of exemplary communications for a portion 300 of network 100. As shown in FIG. 3, network portion 300 may include corporate social platform server 120, public social media server 130, customer service server 140, corporate social platform server 150, data collection server 160, data correlation server 170, and combined database 180. Corporate social platform server 120, public social media server 130, customer service server 140, corporate social platform server 150, data collection server 160, data correlation server 170, and combined database 180 may include features described above in connection with, for example, FIGS. 1 and 2.

As shown in FIG. 3, corporate social platform server 150 may feed internal data and metadata 310 to combined database 180. Internal data and metadata 310 may include, for example, logs of content published by users (e.g., user of user devices 110) via corporate social platform server 150. In one implementation, internal data and metadata 310 may include tags associated with particular posts.

Corporate social platform server 120 for external customers may provide external metadata 320 to data collection server 160; public social media server 130 may provide external metadata 330 to data collection server 160; and customer service server 140 may provide external metadata 340 to data collection server 160. Each of external metadata 320, 330, and 340 may include tags, which data collection server 160 may or may not associate with their corresponding particular posts (e.g., posts published via any of corporate social platform server 120, public social media server 130, or customer service server 140).

Data collection server 160 may receive external metadata 320, 330, and 340 and may, if necessary, associate/label the metadata with a general source (e.g., an external source) or a particular source (e.g., one of corporate social platform server 120, public social media server 130, or customer service server 140). For example, data collection server 160 may use any tag indicator to enable other devices (e.g., data correlation server 170) to distinguish between tags originating in external social platforms and tags originating in internal social platforms. Additionally, or alternatively, data collection server 160 may apply or detect indicators to enable other devices to identify a particular social platform from where a tag originated. In one implementation, data collection server 160 may also reformat the metadata for consistency with other metadata in combined database 180. Data collection server 160 may forward the combined, formatted metadata, as combined external metadata 350, to combined database 180 for storage.

Corporate social platform server 150 may retrieve tag suggestions 360 from combined database 180. Tag suggestions 360 may include tags from both internal data and metadata 310 or combined external metadata 350. When users (e.g., via user devices 110, not shown), create or edit content for publishing via corporate social platform server 150, corporate social platform server 150 may provide particular prompts from tag suggestions 360. In one implementation, corporate social platform server 150 may present tag suggestions 360 to the user in a manner that does not distinguish between metadata sources.

Figure 4B:
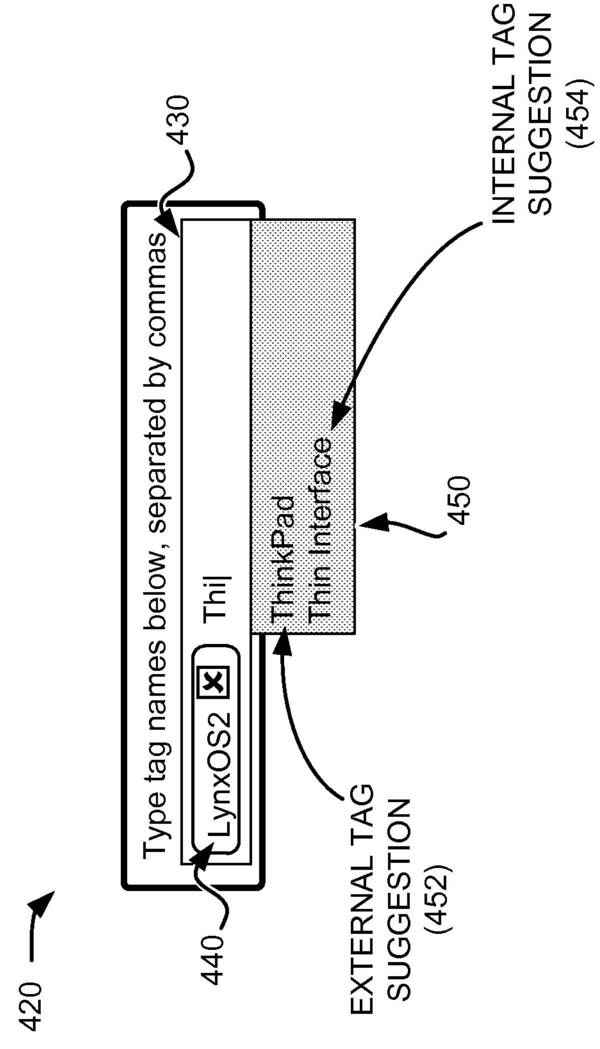

FIGS. 4A and 4B provide sample user interfaces for suggesting tags for employee posts. In one implementation, the user interfaces of FIGS. 4A and 4B may be provided by corporate social platform server 150 to user device 110. As shown in FIG. 4A, a user interface 400 may include a post-creation section 405 that includes a tag-generation option 410 and an add tags section 420. Add tags section 420 may include a tag entry form 430, a current tag list 440, and a suggested tag list 450.

Post-creation section 405 may include an interface to accept text entry, attach files, and/or provide links to other content. A user of user interface 400 may use post-creation section 405 to supply content that can be made available to, for example, other users of corporate social platform server 150. Post-creation section 405 may include tag-generation option 410 to allow a user to associate tags (or keywords) with the content of post-creation section 405. In one implementation, post-creation section 405 may be configured so that content cannot be submitted unless at least one tag is associated with the post.

Tag-generation option 410 may be selected by a user of post-creation section 405 to submit a tag. In one implementation, selection of tag-generation option 410 may cause user interface 400 to present a secondary menu, such as add tags section 420. In other implementations, add tags section 420 may be included as part of post-creation section 405, as an expandable menu, or as a different type of interface.

Add tags section 420 may provide text entry form 430 to permit a user to type an original word or phrase (e.g., to associate with the content of post-creation section 405). Text entry form 430 may also include spell-checking, word suggestion/prediction, and/or auto-correction to help provide uniform tag entries among multiple users/posts. Current tag list 440 may display a list of tags already associated with the current post.

Suggested tag list 450 may include tags suggestions (e.g., tag suggestions 360) from combined database 180. Suggestions in suggested tag list 450 may include keywords extracted from either of internal data and metadata 310 or combined external metadata 350. However, the original source of the suggestions in suggested tag list 450 may not be presented in user interface 400. For example, in the arrangement of FIG. 4A, "Web Design" in suggested tag list 450 may be a keyword extracted from internal data and metadata 310, while "Thin Interface" in suggested tag list 450 may be a keyword extracted from combined external metadata 350. Suggestions in suggested tag list 450 may be generated by corporate social platform server 150 (or a user device 110 in communication with corporate social platform server 150) based on keyword matching (using text from post-creation section 405), trending, prediction, and/or auto-correction. A user may select a suggestion from suggested tag list 450 to add the selection to current tag list 440.

FIG. 4B provides another exemplary format for add tags section 420. As shown in FIG. 4B, text entry form 430 may include a text box for a user to enter text for a tag name. Tags names may be separated, for example, by commas. Completed name entries may be presented in a visual box to form current tag list 440. Suggested tag list 450 may be presented as a list of suggestions based on text initiated by the user in text entry form 430. Suggestions in suggested tag list 450 may be generated, for example, based on prediction techniques and/or available keywords in combined database 180. Suggestions may include keywords extracted from either of internal data and metadata 310, combined external metadata 350, or other sources. For example, as shown in FIG. 4B, an entry (e.g., "Thi") in text entry form 430 may generate a suggestion from external metadata (e.g., "ThinkPad"), as indicated by reference 452, and a suggestion from internal metadata (e.g., "Think Interface"), as indicated by reference 454.

Although FIGS. 4A and 4B show example arrangements of user interface 400 for suggesting tags, in other implementations, user interface 400 may include different arrangements and or information than depicted in FIGS. 4A and 4B. Furthermore, the presentation of data may vary within each section of user interface 400.

Returning to FIG. 3, the user of user device 110 may publish (e.g. via corporate social platform server 150) a created or edited post with metadata that may include one or more tags from tag suggestions 360 and/or new tags. Corporate social platform server 150 may again feed the published content as internal data and metadata 310 to combined database 180 and the set of tag suggestions 360 may be updated with the newly received metadata.

Data correlation server 170 may retrieve internal data and metadata 310 and combined external metadata 350 to discover relationships between metadata originating from internal sources (e.g., tags in internal data and metadata 310) and metadata originating from external sources (e.g., tags in combined external metadata 350). For example, data correlation server 170 may determine the level of adoption of the customer tags by the employees. Additionally, or alternatively, data correlation server 170 may determine the penetration of the customer tags into the employee posts.

Figure 5:
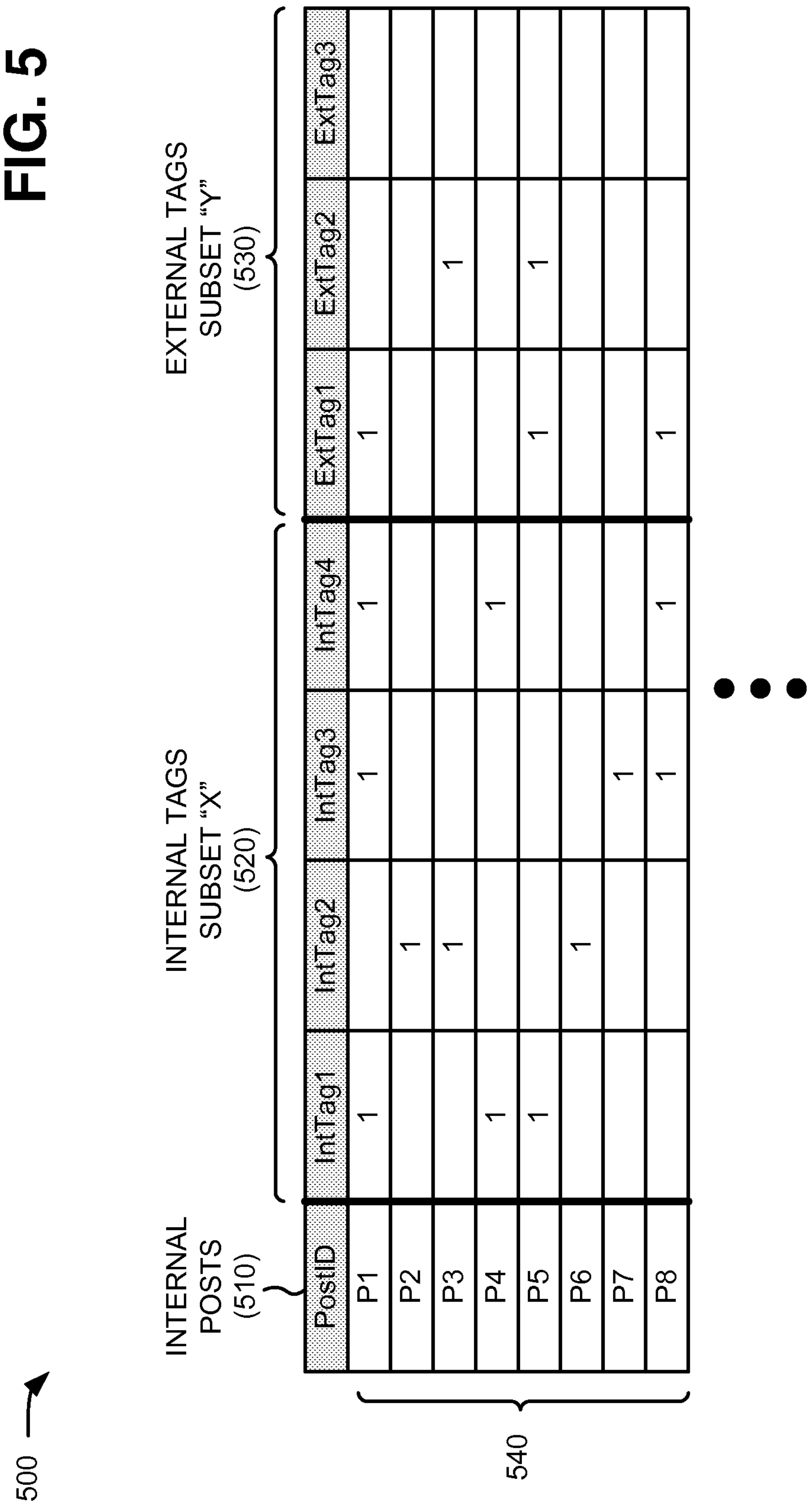
FIG. 5 is a diagram of an sample data structure that may be generated by the network of FIG. 1.

In one implementation, data correlation server 170 may employ known data correlation techniques, such as association rule mining, to determine tag relationships. For example, data correlation server 170 may use the fact that the customer tags in combined database 180 are known to develop association rules for the employee tags and customer tags. For example, assume employee tags are represented by "X" and customer tags are represented by "Y." In a rule of the type X→Y (i.e., the occurrence of subset X implies the occurrence of subset Y), the subsets Y containing the customer tags are known. FIG. 5 provides an example of such a dataset 500.

Referring to FIG. 5, dataset 500 may include an internal post ID field 510, a set of internal tag fields 520, a set of external tag fields 530, and a number of rows 540 including entries for each of field 510-530. Each row 540 may correspond to a separate internal (e.g., employee) post (e.g., a blog, wiki or forum post, files, etc.). Each internal post may have associated with it tags that are selected by the employee (e.g., as part of creating/editing the post). Some of the employee-selected tags may originate from employees (e.g., from internal data and metadata 310) and some the employee-selected tags may originate from customers (e.g., from combined external metadata 350). However, the employee, when selecting an appropriate tag would not be aware of the tag origin.

Internal post ID field 510 may include a unique identifier for an employee post (e.g., published via corporate social platform server 150 for internal users). In one implementation, each post received via internal data and metadata 310 may include a unique identifier and at least one employee tag or customer tag.

Internal tag fields 520 may include a separate field for each unique tag created by an employee and stored in combined database 180. While only four internal tags are shown in FIG. 5 for simplicity, it should be understood that hundreds or thousands of separate tag fields may be included in internal tag fields 520. Each usage instance of a particular internal tag in a particular post may be marked (e.g., by a "1") in a row 540 corresponding to that particular post. For example, as shown in FIG. 5, post "P3" would be associated with internal tag "IntTag2."

External tag fields 530 may include a separate field for each unique tag created by an external customer and stored in combined database 180. While only three external tags are shown in FIG. 5 for simplicity, it should be understood that hundreds or thousands of separate tag fields may also be included in external tag fields 530. Each usage instance of a particular external tag in a particular post may be marked (e.g., by a "1") in a row 540 corresponding to that particular post. For example, as shown in FIG. 5, post "P3" would be associated with external tag "ExtTag2."

In one implementation, data correlation server 170 may determine the usage of the customer tags by the employees over the total of customer tags at their disposal (e.g., as represented by the set of external tags fields 530). In other words, data correlation server 170 may identify the number of external tag fields that have at least one (or another threshold value great than one) usage instance in dataset 500. This metric may show the level of adoption of the customer tags by the employees and provide a basic measure of the employee attention focus on the customer topics. For example, in the simplified dataset 500, two thirds of the customer tags (e.g., namely, ("ExtTag1" and "ExtTag2") have been associated with internal posts and one third of the customer tags (e.g., namely, "ExtTag3") have not been addressed.

In another implementation, data correlation server 170 may determine the proportion of employee posts (e.g., as represented by the total number of entries in internal post ID field 510) that have a customer tag associated with the post and the proportion of employee posts that do not have a customer tag associated with the post. This metric may show the penetration of the customer tags. For example, in the simplified dataset 500, fifty percent of the internal posts (e.g., four of eight, namely, "P1," "P3," "P5," and "P8") have a customer tag associated with a post, while the other fifty percent (e.g., namely, "P2," "P4," "P6," and "P7") do not have a customer tag associated with a post.

In still another implementation, data correlation server 170 may generate a graphical representation of data from association rule mining to show the relationships among all the internal and external tags (e.g., in dataset 500). Data correlation server 170 may perform the data mining by computing the support of rules in an employee tag implying a customer tag. Graphs with various levels of relationships can be obtained by adjusting the minimum confidence expected in a rule. An example of a graphical representation is shown in FIG. 6.

Figure 6:
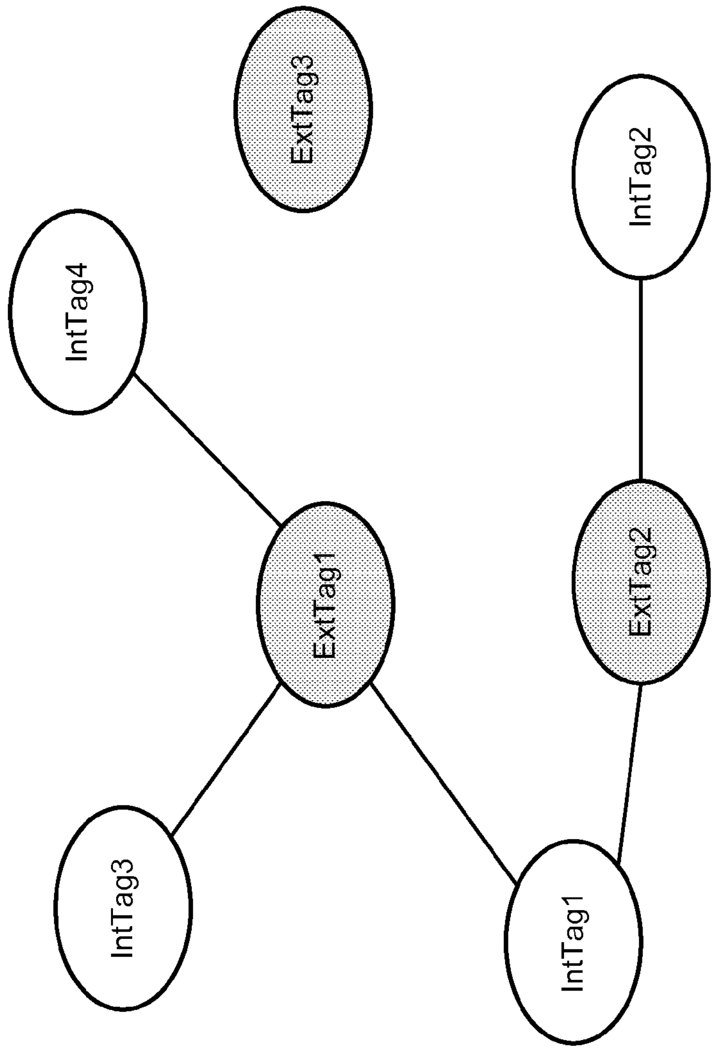
FIG. 6 is a diagram of a sample relationship graph that may be generated by the correlation server of FIG. 1.

As shown in FIG. 6, relationships between internal employee tags (e.g., as represented by the set of internal tags fields 520) and external customer tags (e.g., as represented by the set of external tags fields 530) can be shown with connecting lines. Tag "ExtTag1" is shown with relationships to "IntTag1," "IntTag3," and "IntTag4." Tag "ExtTag2" is shown with relationships to "IntTag1" and "IntTag2." Tag "ExtTag3" is shown without any relationship to an employee tag, which may indicate a failure to address a customer issue, depending on the relevance/significance of "ExtTag3."

Figure 7:
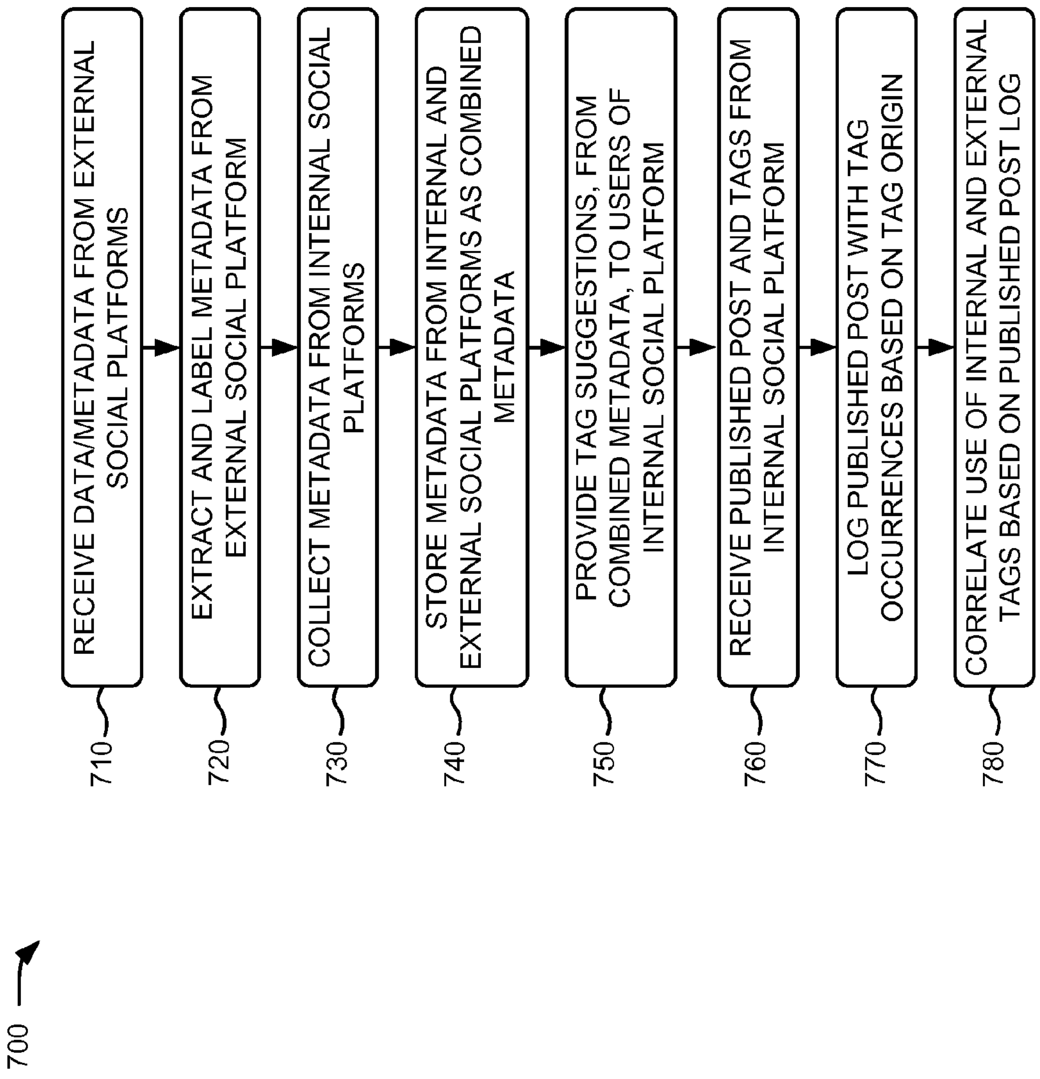
FIG. 7 is a flow chart of an exemplary process for performing data mining across multiple social platforms according to an implementation described herein.

FIG. 7 is a flow chart of an example process for conducting data mining of across multiple social platforms according to implementations described herein. In one implementation, process 700 may be performed by a group of devices including corporate social platform server 150, data collection server 160, and data correlation server 170. In another implementation, some or all of process 700 may be performed by another device or group of devices, including or excluding corporate social platform server 150, data collection server 160, and data correlation server 170.

As shown in FIG. 7, process 700 may include receiving data and/or metadata from external social platforms (block 710) and extracting/labeling the metadata from the external social platform (block 720). For example, in implementations described above in connection with FIG. 3, corporate social platform server 120 for external customers, public social media server 130, and customer service server 140 may provide external metadata 320, 330, and 340, respectively, to data collection server 160. Each of external metadata 320, 330, and 340 may include tags, which data collection server 160 may or may not associate with their corresponding particular posts. Data collection server 160 may receive external metadata 320, 330, and 340 and may, if necessary, associate and/or label the external metadata with a general source of origin (e.g., an external source) or a particular source (e.g., one of corporate social platform server 120, public social media server 130, or customer service server 140).

Process 700 may also include collecting metadata from internal social platforms (block 730). For example, in implementations described above in connection with FIG. 3, corporate social platform server 150 may feed internal data and metadata 310 to combined database 180. Internal data and metadata 310 may include, for example, logs of content published by users (e.g., user of user devices 110) via corporate social platform server 150. In one implementation, internal data and metadata 310 may include tags associated with particular posts.

As further shown in FIG. 7, process 700 may include storing the metadata from the internal and external social platforms as combined metadata (block 740), and providing tag suggestions from the combined metadata to users of the internal social platform (block 750). For example, in implementations described above in connection with FIG. 3, data collection server 160 may forward the combined, formatted metadata from corporate social platform server 120 for external customers, public social media server 130, and customer service server 140, as combined external metadata 350, to combined database 180 for storage. Combined eternal metadata 350 and internal data and metadata 310 may, thus, be stored together in combined database 180. Corporate social platform server 150 may retrieve tag suggestions 360 from combined database 180. Tag suggestions 360 may include tags from both internal data and metadata 310 and/or combined external metadata 350.

Process 700 may also include receiving a published post and associated metadata from the internal social platform (block 760), logging the published post with tag occurrences based on tag origin (block 770), and correlating the use of the internal and external tags based on the published post log (block 780). For example, in implementations described above in connection with FIG. 3, the user of user device 110 may publish (e.g. via corporate social platform server 150) a created or edited post with metadata that may include one or more tags from tag suggestions 360 and/or new tags. Corporate social platform server 150 may again feed the published content as internal data and metadata 310 to combined database 180 and the set of tag suggestions 360 may be updated with the newly received metadata. Data correlation server 170 may retrieve internal data and metadata 310 and combined external metadata 350 to discover relationships between metadata originating from internal sources (e.g., tags in internal data and metadata 310) and metadata originating from external sources (e.g., tags in combined external metadata 350). Data correlation server 170 may use the fact that the origin of customer tags in combined database 180 is known to develop association rules for the employee tags and customer tags.

Implementations described herein may include systems and/or methods that may feed customer metadata captured from external social platforms into corporate social platforms used by employees. The systems and/or methods may enable data mining of the subsequent employee posts on the corporate social platforms to measure the focus of employees on the customers" issues. The systems and/or methods herein may promote use of social platforms (over, e.g., corporate email) to permit data correlation to determine how well everyday business activity is tuned to the market.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 7, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of is intended to include one or more items. Further, the phrase "based on" is intended to mean "based, at least in part, on" unless explicitly stated otherwise.

What is claimed is:

1. A method implemented by one or more computing devices, the method comprising:

receiving, by the one or more computing devices, customer metadata for an external social platform, wherein the customer metadata includes customer tags used with published content;

receiving, by the one or more computing devices, employee metadata for an internal social platform, wherein the employee metadata includes post identifiers and employee tags associated with particular posts;

generating, by the one or more computing devices, tag suggestions for a new post on the internal social platform, wherein the tag suggestions are selected from a group of data including the customer tags and the employee tags and wherein the group of data includes an indication of the origin of each of the customer tags and the employee tags as from the internal social platform or the external social platform;

receiving, by the one or more computing devices, additional internal metadata for new posts for the internal social platform, wherein the additional internal metadata includes new post identifiers and one or more selected tags associated with the new posts, wherein the selected tags are selected from the tag suggestions; and performing, by the one or more computing devices, data correlation to determine a level of employee focus on customer issues, wherein the data correlation is based on the new post identifiers, the one or more selected tags, and an indication of the selected tags as being selected from a tag suggestion originating from the internal social platform or the external social platform, and wherein the level of employee focus on customer issues is determined by a level of adoption of the customer tags in the new posts for the internal social platform, based on how many customer tags are included in the additional internal metadata.

2. The method of claim 1, wherein the tag suggestions are presented to a user without indication of origin from the internal social platform or the external social platform.

3. The method of claim 1, further comprising:

assigning particular tags, from the selected tags, as employee tags when the particular tags were first included in the employee metadata;

assigning other particular tags, from the selected tags, as customer tags when the other particular tags were first included in the customer metadata;

storing, in a combined data structure, the employee tags, the customer tags, and the selected tags.

4. The method of claim 1, wherein to the external social platform is available via a public network and wherein the internal social platform includes restricted access via a private network.

5. The method of claim 1, wherein the additional internal metadata further includes original tags for published content.

6. The method of claim 5, further comprising:

extracting from the customer metadata the customer tags.

7. The method of claim 5, further comprising labeling the customer tags with a source of origin associated with the external social platform.

8. The method of claim 1, wherein performing the data correlation further comprises:

determining how many customer tags of a total number of customer tags in the customer metadata are included in the additional internal metadata.

9. The method of claim 1, wherein performing the data correlation further comprises:

determining a proportion of the new posts in the additional internal metadata that has at least one associated customer tag.

10. The method of claim 1, further comprising:

generating a graphical representation of the relationships between the employee tags, the customer tags, and the selected tags.

11. A system, comprising:

a memory to store a plurality of instructions; and a processor configured to execute instructions in the memory to:

receive first metadata including new customer tags for content published on an external social platform, receive second metadata including new employee tags for content published on an internal social platform, store, in a combined dataset, the new customer tags from the first metadata and the new employee tags from the second metadata, wherein each of the new customer tags and the new employee tags are identified in the combined data set as originating from an external source or an internal source, generate, from the combined dataset, tag suggestions for new content to be published on the internal social platform, receive additional second metadata for additional content published on the internal social platform, wherein the additional second metadata includes selected tags selected from the tag suggestions, identify the selected tags in the additional second metadata as customer tags or employee tags based on source identifications in the combined data set, and determine a level of employee focus on customer issues, based on the identifications as customer tags or employee tags and relationships between use of the customer tags and use of the employee tags in the additional second metadata, wherein determining the level of employee focus on customer issues includes determining, based on how many customer tags are included in the additional second metadata, a level of adoption of the customer tags in the additional content published on the internal social platform.

12. The system of claim 11, wherein, when generating tag suggestions, the processor is further configured to:

present the tag suggestions to a user without indication of origin from the internal social platform or the external social platform.

13. The system of claim 11, wherein the processor is further configured to:

extract from the external metadata the customer tags, and extract from the internal metadata the employee tags.

14. The system of claim 11, wherein the processor is further configured to:

label the customer tags with a source of origin associated with the external social platform.

15. The system of claim 11, wherein, when determining a level of employee focus on customer issues, the processor is further configured to:

determine, based on how many individual posts of the additional published content include a customer tag, a level of penetration of the customer tags in the additional content published on the internal social platform.

16. The system of claim 11, wherein the processor is further configured to:

generate a graphical representation of the relationships between the use of the employee tags and the use of the customer tags in the additional second metadata.

17. A non-transitory computer-readable medium, comprising computer-executable instructions, for causing one or more processors executing the computer-executable instructions to:

store, in a memory, customer tags originating on an external social platform and employee tags originating on an internal social platform, wherein the customer tags and employee tags include an indication of the origin as from the internal social platform or the external social platform;

provide, to a user device, keyword suggestions for new content to be published on the internal social platform, wherein the keyword suggestions include selections from both the customer tags and the employee tags;

receive employee metadata for content published on the internal social platform, wherein the employee metadata includes tags selected from the keyword suggestions;

associate the tags in the employee metadata as customer-originated tags or employee-originated tags based on the stored customer tags and employee tags; and perform data correlation to determine a level of employee focus on customer issues based on relationships between use of the customer-originated tags and use of the employee-originated tags in the employee metadata, wherein instructions to perform data correlation further include instructions to:

determine a level of adoption of the customer tags in the employee metadata for content published on the internal social platform, or determine a level of penetration of the customer tags in the employee metadata for content published on the internal social platform.

18. The computer readable medium of claim 17, further comprising computer-executable instructions, for causing one or more processors executing the computer-executable instructions to:

present the keyword suggestions to a user without indication of origin.

* * * * *